United States Patent
Ju

(12) 
(10) Patent No.: US 6,322,026 B1
(45) Date of Patent: Nov. 27, 2001

(54) PORTABLE HUNTING AND FISHING STAND

(76) Inventor: Howard Ju, 301 McCain, Greenwood, MS (US) 38930

(*) Notice: Subject to any disclaimer, the term of this patent is extended or adjusted under 35 U.S.C. 154(b) by 0 days.

(21) Appl. No.: 09/550,308

(22) Filed: Apr. 14, 2000

(51) Int. Cl.[7] ............................................. F16M 11/00
(52) U.S. Cl. ......................... 248/175; 42/94; 248/166; 248/538
(58) Field of Search .................... 248/175, 538, 248/150, 151, 163.2, 165, 166, 176.1; 42/94; 43/21.2; 89/37.04

(56) References Cited

U.S. PATENT DOCUMENTS

| | | | |
|---|---|---|---|
| 691,912 | * 1/1902 | McClean | 42/94 |
| 2,752,115 | 6/1956 | Green . | |
| 3,608,852 | * 9/1971 | Horn | 248/166 |
| 3,636,649 | 1/1972 | Paiva . | |
| 4,017,997 | 4/1977 | Peterson et al. | 42/94 |
| 4,043,070 | 8/1977 | Lamothe | 43/21.2 |
| 4,086,716 | 5/1978 | Donahue | 248/533 |
| 4,159,816 | 7/1979 | Miyamae | 248/515 |
| 4,177,595 | 12/1979 | Chon | 43/21.2 |
| 4,562,945 | 1/1986 | Erlandson . | |
| 4,967,497 | 11/1990 | Yakscoe | 42/94 |
| 5,149,900 | 9/1992 | Buck | 42/94 |
| 5,414,949 | 5/1995 | Peebles | 42/94 |
| 5,481,817 | 1/1996 | Parker | 248/286.1 |
| 5,571,227 | 11/1996 | Pisarek | 248/513 X |
| 5,628,135 | 5/1997 | Cady | 42/94 |
| 5,666,757 | 9/1997 | Helmstadter | 42/94 |
| 5,930,933 | 8/1999 | Schleicher | 42/94 |
| 5,933,999 | 8/1999 | McClure et al. | 42/94 |
| 6,128,848 | * 10/2000 | Wong | 43/21.2 |

\* cited by examiner

*Primary Examiner*—Ramon O. Ramirez
(74) *Attorney, Agent, or Firm*—Pillsbury Winthrop LLP

(57) ABSTRACT

A light weight, portable, and inexpensive tri-pod gun and/or fishing rod stand that can be collapsed and easily stowed and/or carried includes a central member, which forms the first leg, and a V-shaped support structure that is pivotally attached to the central member, thereby forming the second and third legs of the tri-pod. The V-shaped support structure is maintained at a selected orientation relative to the central member by a first set of connecting struts that are releasably connected to the central member, at selected positions along the central member, and pivotally attached to the legs of the V-shaped support structure. By disengaging the first set of connecting struts and connecting a releasably connectable second set of struts, located near the pivoting connection of the V-shaped support structure and the central member, to the central member at a selected position, the structure is able to straddle an upright wall, such as the side of a fishing boat.

22 Claims, 4 Drawing Sheets

PORTABLE HUNTING AND FISHING STAND

FIELD OF INVENTION

The present invention is directed to an improved gun and/or fishing rod support stand. In particular, the present invention is directed to a support stand that can be easily configured to be supported on the ground or an upright wall, such as the side of a boat. The support is light weight, adjustable, collapsible, and can be easily stowed and/or transported.

BACKGROUND OF THE INVENTION

Gun supports date from the 16th Century. The earliest gun supports consisted of a single long pole with U-shaped support which held a long musket shot in the standing position. Recent prior art can be characterized into two types of gun supports: those primarily used to sight-in a firearm and those used while hunting to support the rifle while shooting at game. The supports that are used to sight-in the firearm are typically large, cumbersome, and difficult to maneuver, but are suitable for their function since mobility is not an issue when the shooter is sighting-in a firearm. These types of rifle supports are exemplified by U.S. Pat. Nos. 5,930,933, 5,414,949, 5,666,757, and 5,628,135.

A hunter, however, requires a firearm support device that is portable, lightweight, and easy to maneuver and/or adjust. Of recent, the prior art has attempted to provide hunters with such supports, as exemplified by U.S. Pat. Nos. 4,017,997 ("'997") and 4,967,497 ("'497"). U.S. Pat. No. '997 utilizes a bi-pod support structure where the end of the rifle barrel is clamped to the supporting block and the two legs of the bi-pod are telescopically adjustable in height. U.S. Pat. No. '497 utilizes a tri-pod support structure which can be adjusted for height, and where the third leg of the tri-pod can accommodate a seat. The '497 support collapses for carrying in a backpack strapped to the hunter, and the '997 support can be carried in the pocket of a garment.

While the prior art has attempted to provide hunters with portable supports, their discrete maneuverability is still a significant drawback to their use. A hunter typically does not know from which direction their prospective game will enter their view, thus, the hunter must have the ability to quickly and discretely change positions and locations within a relatively small zone. Accordingly, as the hunter changes his position and/or location, he must also stealthily alter the position of the stand, i.e., the stand should not be an impediment to the hunter's mobility. The prior art has not solved this problem. U.S. Pat. No. '497, for example, is quite large and is difficult to discretely move once pre-set at a specific height and position. U.S. Pat. No. '997 is more maneuverable than '497, but once the barrel is clamped in the support, the support becomes, in effect, part of the rifle, and when the hunter changes position, he has no choice but to readjust the telescopic bi-pods to the new terrain, or, if he chooses a position not suitable for the bi-pods, he must unscrew the clamping bolts to remove the stand from the rifle, all while his keen prey listen astutely.

Therefore, it is the object of the present invention to provide a light weight, portable rifle support that is collapsible and can be carried in the pocket of a garment. Additionally, it is an object of the present invention to provide a support that is unobtrusive should the hunter be required to change positions and/or locations after spotting his prey.

It is a further object of the present invention that the portable rifle support be easily reconfigured to be attachable to the side of boat for supporting a fishing rod.

SUMMARY OF THE INVENTION

The aforementioned is accomplished in accordance with principles of the present invention by providing a portable, light weight, tri-pod, collapsible stand, where the stand comprises an elongated central member having a two-pronged fork on each end thereof, the central member forming the first leg of the tri-pod stand and having a plurality of protruding portions defining fixed positions along said central member. A V-shaped support structure is pivotally attached at its apex to an intermediate position along the central member, thus forming the second and third leg of the stand, which, together with the first leg, defines a stand that is self supporting in a generally upright orientation. A supporting strut spans the V-shaped support structure at an intermediate position thereof to provide rigidity thereto. Also, a set of connecting struts are each pivotally attached at one end, with pivoting mobility about all axes, to a leg of the V-shaped support structure and releasably connectable at its other end to the central member, so that when the connecting struts are releasably connected to the central member the support structure is maintained at the selected orientation with respect to the central member to define a stand in a first configuration, which is suitable for supporting the barrel of a gun or other extended object.

The stand also embodies a second configuration, where an end of the central member and V-shaped support structure are configured to straddle an upright wall. In this configuration, the first set of connecting struts are disengaged from the central member. A second set of connecting struts, attached similarly as the first set of connecting struts to the V-shaped support structure, but positioned near its apex, are releasably connected to the central member at a protruding portion that is in close proximity to the pivoting location of the V-shaped support structure. Disengaging the first set of connecting struts provides an open space for accommodating an upright wall.

By disengaging both the first and second set of connecting struts from the central member, the portable stand can collapse into a structure that can be easily stowed and/or transported.

Further collapsibility may be accomplished by providing the V-shaped support structure, at its apex, with a pivotal connector such that the two legs thereof are collapsible toward each other. In this embodiment, the supporting strut, which spans the legs of the V-shaped support structure, is releasably connectable to one leg of the support structure.

Other objects, features, and characteristics of the present invention, as well as the methods of operation of the invention and the function and interrelation of the elements of structure, will become more apparent upon consideration of the following description and the appended claims with reference to the accompanying drawings, all of which form a part of this disclosure, wherein like reference numerals designate corresponding parts in the various figures.

DETAILED DESCRIPTION OF THE DRAWINGS

Figure 1:
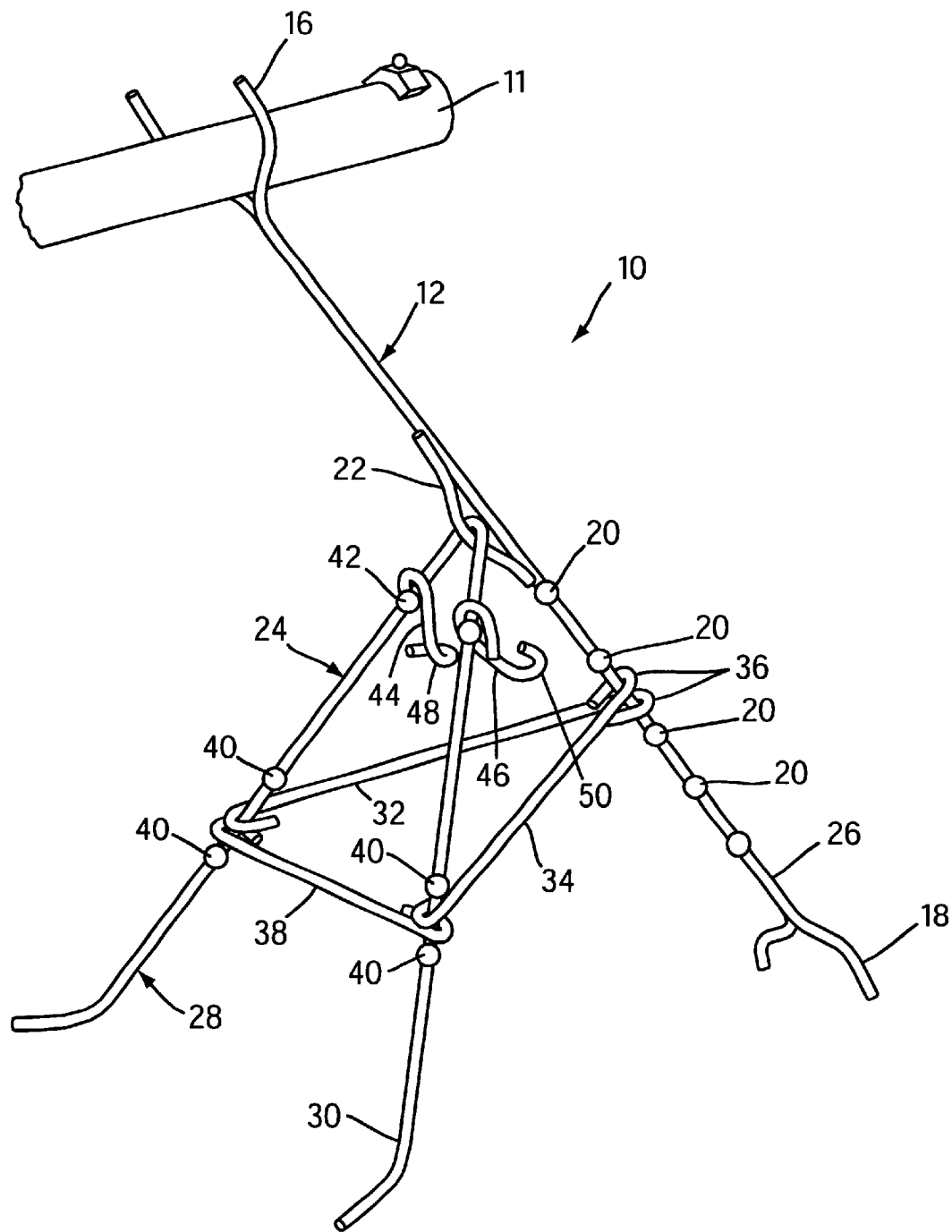
FIG. 1 is a perspective view of the first embodiment of the portable stand, with the structure configured to provide support for a gun barrel or other elongated device.

The present invention is described with reference to the Figures wherein the same numbers are used where applicable. A perspective view of the portable stand 10 is shown in FIG. 1. The material used to make the portable stand 10 is preferably aluminum rod having a diameter preferably not greater than 0.25 inches. The portable stand 10 can also be made of other materials that provide a light weight but rigid structure, such as steel rod, plastic, fiberglass composite, etc.

Referring to FIG. 1, portable stand 10 comprises a central member 12, which has a two-pronged fork 16, 18 at each end. One end of this central member 12 forms the first leg 26 of the portable stand 10. Fork 18 can be supported by a generally horizontal surface. A gun barrel 11 or other elongated object rests within fork 16. Central member 12 has a plurality of protruding portions 20 defining fixed positions along its length. These protruding portions 20 may comprise raised nodules of molten metal solidified to central member 12, such as beads of solder, weld, or brazing. Or protruding portions 20 may comprise cylindrical rings that are slipped over central member 12 and soldered, brazed, welded, or otherwise fixed into place. At an intermediate position of central member 12, a pivotal connector 22 is fixed thereto. This pivotal connector 22 may comprise a bent rod that is soldered, brazed, welded, or otherwise fixed to the central member 12.

Pivoting about the central member 12 at pivotal connector 22 is a V-shaped support structure 24. In the embodiment shown in FIG. 1, the V-shaped support structure 24 is made from one piece of rod that is bent into a V-shape. Being pivotally attached via the pivotal connector 22 to the central member 12, the V-shaped support structure 24 forms the second 28 and third 30 leg of the portable stand 12. The ends of second leg 28 and third leg 30 are bent from the axes thereof to form feet-like portions 29, 31. The feet-like portions 29, 31 can be supported on a horizontal surface and prevent the stand 10 from penetrating or sinking when the stand 10 supports the weight of a gun barrel or similar object on a horizontal surface that is relatively soft, such as soft or sandy ground.

Positioned intermediate each leg 28, 30 of support structure 24 are at least two connecting struts 32, 34. Each of the connecting struts 32, 34 at one end is pivotally attached, with pivoting mobility about all three axes, to a respective one of the legs 28, 30 of the support structure 24, and is releasably connectable, by a releasable connecting mechanism 36, to central member 12 at selected locations defined by the protruding portions 20. In the configuration shown in FIG. 1, the connecting struts 32, 34 are connected to central member 12; therefore, the V-shaped support structure 24 is maintained at the selected orientation with respect to the central member 12 to define the overall stand "posture."

The releasable connecting mechanism 36 shown in FIG. 1 comprises the ends of the connecting struts 32, 34 being bent into a hook of suitable size to fit with a slight interference around central member 12. The protrusions 20 limit the extent to which the mechanisms 36 can slide along the member 12, thereby fixing the position of the releasable connecting mechanism 36 within a range of movement along the central member 12 defined between adjacent pairs of protruding portions 20. It will be understood to those skilled in the art that other releasable connecting mechanisms can be utilized to connect the connecting struts 32, 34 to central member 12.

The height of the stand 12 is adjusted, therefore, by connecting the connecting struts 32, 34 at varying positions defined by protruding portions 20 along central member 12 to thereby vary the orientation of the V-shaped support member 24 with respect to the central member 12.

In order to prevent the V-shaped support structure 24 legs 28, 30 from spreading apart when the portable stand 10 is being used, i.e., due to the weight of a gun barrel resting within fork 16, a supporting strut 38 is provided at an intermediate position on legs 28, 30. In the embodiment shown in FIG. 1, this supporting strut 38 is made from rod material that is bent around legs 28, 30. The supporting strut 38 can also be soldered, brazed, welded, or otherwise fixed to legs 28, 30. Protruding portions 40 are provided on legs 28, 30 of the V-shaped support structure 24 to provide stops for connecting struts 32, 34 and the supporting strut 38.

Figure 3:
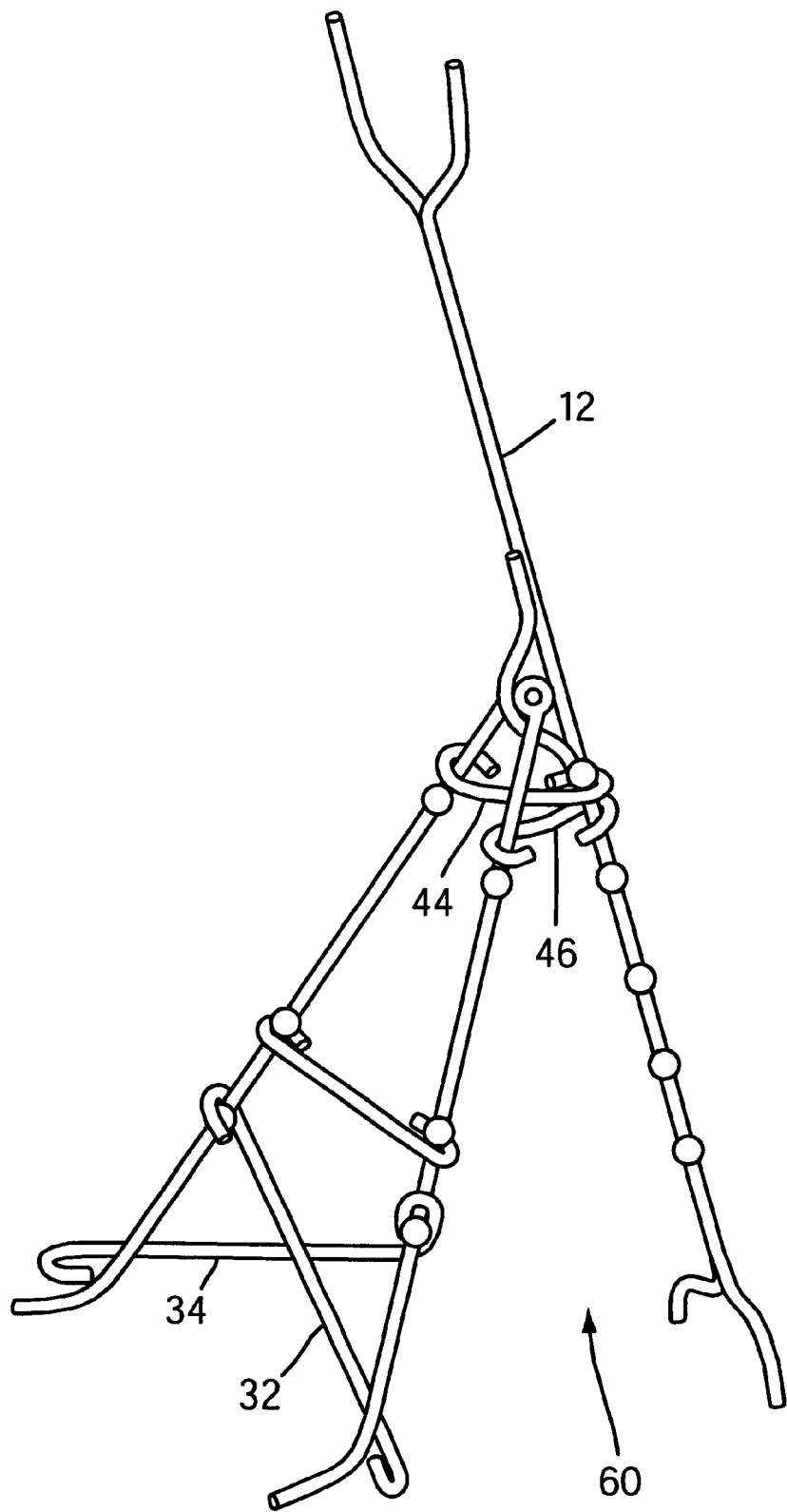
FIG. 3 is a perspective view the second embodiment configured to straddle a wall, such as the side of a fishing boat, for supporting a fishing rod.
Figure 4:
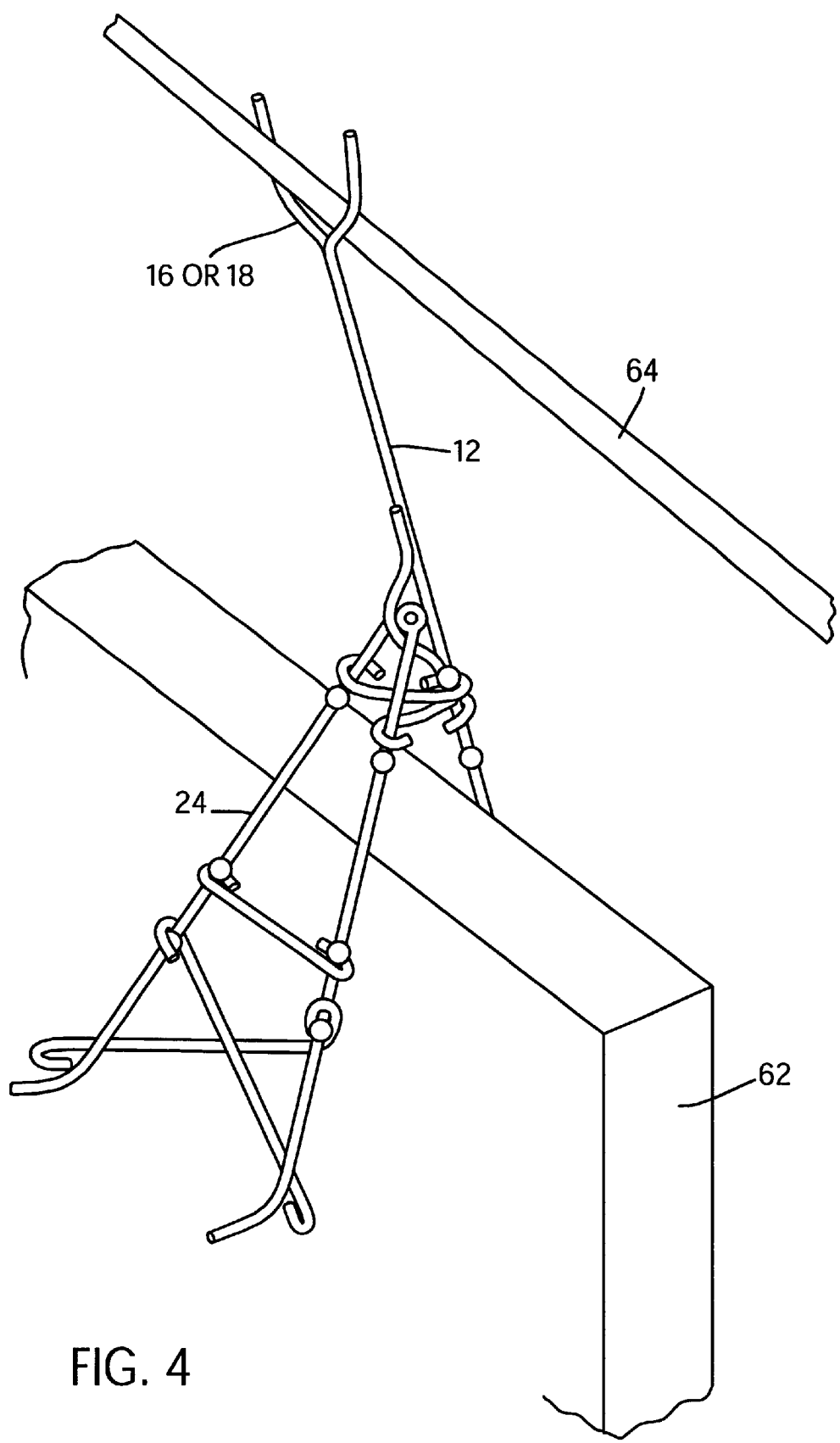
FIG. 4 is a depiction of the embodiment of FIG. 3 with the portable stand shown straddling a wall.

In the preferred embodiment, a second set of connecting struts 44, 46 are provided near the apex of the V-shaped support structure 24. These struts 44, 46 are similarly designed to the first set of connecting struts 32, 34 and are at one end releasably connectable, via a releasable connecting mechanism 48, 50, to the central member 12. The other ends are pivotally attached, with pivoting mobility about all three axes, to the legs 28, 30 of the V-shaped support structure 24. This second set of struts 44, 46 are used when the stand is configured to straddle an upright wall, as shown in FIGS. 3 and 4 and discussed infra. The arrangement shown in FIG. 3 is not a stable configuration for supporting the stand 10 by means of the three legs 26, 28, 30 on the ground. On the other hand, the arrangement shown in FIGS. 1 and 2, whereby the support structure 24 is connected to the central member 12 by connecting struts 32, 34 at positions further from the apex is a more stable configuration on the ground.

It will be understood that when the connecting struts 32, 34 are disengaged from central member 12, support structure 24 will collapse toward central member 12, and the structure can then be readily stowed and/or transported.

Figure 2:
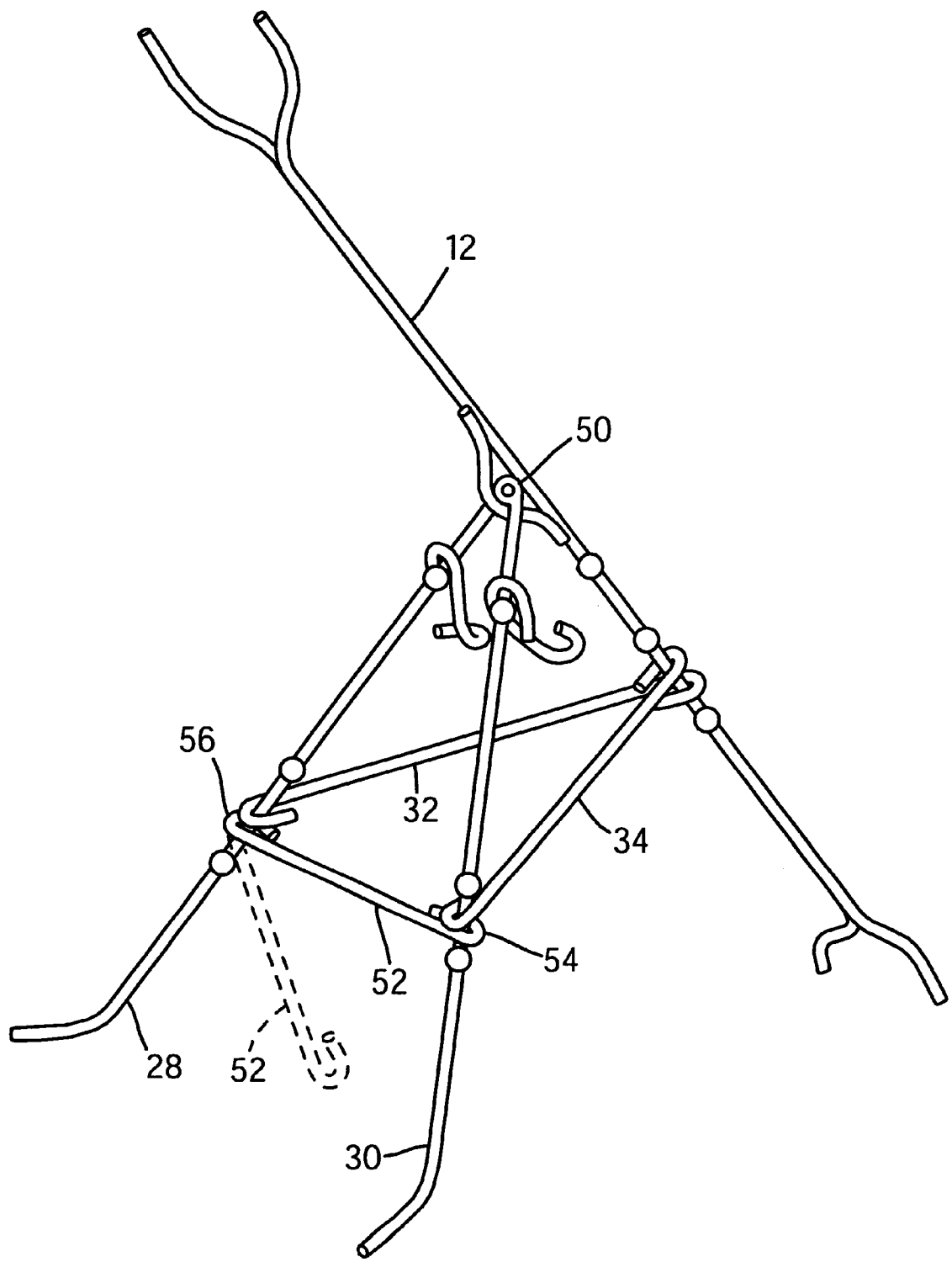
FIG. 2 is a perspective view of a second embodiment of the present invention, where the V-shaped support structure is also collapsible, the structure being configured to provide support for a gun barrel or other elongated device.

Further collapsibility is provided in the second embodiment shown in FIG. 2, which has two differences from the embodiment described in FIG. 1. The first difference is that the V-shaped support structure 24 is made from two individual legs 28, 30 that are connected at its apex by a pivotal connector 50, such as a rivet or nut and bolt. The second difference is that the supporting strut 52 spanning legs 28, 30, is now releasably connectable at one end 54 to one of legs 28, 30 (shown connected to leg 30 in FIG. 2). The other end 56 is pivotally attached to leg 28. Strut 52 is shown disengaged from leg 30 by the dashed phantom lines in FIG. 2. This embodiment therefore allows, when struts 32, 34 are disengaged from central member 12 and strut 52 is disengaged from leg 30, complete collapse of the portable stand 10: the V-shaped support structure 24 can collapse toward central member 12 and the two legs 28, 30 can collapse toward each other, thus providing a collapsed portable stand.

Referring now to FIG. 3, in order to configure the portable stand 10 of FIGS. 1 or 2 so that it can straddle a wall 62, connecting struts 32, 34 are disengaged from central member 12, and the second set of connecting struts 44, 46 are releasably connected to central member 12. Disengaging connecting struts 32, 34 provides for an open space 60. The portable stand 10 can then be placed atop a wall 62, as shown in FIG. 4, where the central member 12 and V-shaped support structure 24 straddle the wall 62. Wall 62 can be, for example, the side of a fishing boat, and thus forks 16 or 18 can be used to support a fishing rod 64 or other elongated member.

The portable stand described above is light weight, compact, and inexpensive to construct. With the central member 12 preferably not being greater than 16 inches long and being fully collapsible, the structure can easily be carried in the pocket of a garment. The structure and arrangement of components of the present invention are also suitable for use with larger stands as well. Its tri-pod design, where the three legs are defined by a two-pronged fork and two ends of the V-shaped support structure, can readily be placed securely on virtually any kind of terrain, such as a that containing numerous rocks, or having tall grass, etc. Additionally, the portable support is not cumbersome, so that should the hunter or fisherman be required to adjust his position and/or location after initially setting up the stand, he can move the stand in an unencumbered and discrete manner because it is small and light weight, and thus easily maneuverable. The support is also easily adaptable to be used as a fishing stand when configured to straddle the side of a boat. Of course, the stand can also be used to support a fishing rod off the ground for shore fishing.

The aforementioned dimensions are not intended as limitations of the invention, but are supplied only as an exemplar of the embodiments described herein.

While the invention has been described in connection with what is presently considered to be the most practical and preferred embodiments, it is to be understood that the invention is not to be limited to the disclosed embodiments, but, on the contrary, is intended to cover various modifications and equivalent arrangements included within the spirit and scope of the appended claims.

Furthermore, it should be noted that the appended claims do not include language in the 'means for performing a specified function' format permitted under 35 U.S.C. §112 (¶6), because it is intended that the appended claims not be interpreted under 35 U.S.C. §112(¶6) as being limited to the structure, material, or acts described in the present specification and their equivalents.

I claim:

1. A portable stand for supporting a portion of an elongated object such as a gun barrel or a fishing rod, said stand comprising:

an elongated central member having a two-pronged fork on each end thereof, said central member forming a first leg of said stand;

a V-shape support structure pivotally attached at its apex to an intermediate position along said central member, said V-shaped support structure forming a second and a third leg of said stand, which, together with said first leg, defines a stand that is self supporting in a generally upright orientation with said first, second and third legs being supported on a generally horizontal support surface; and a first set of connecting struts consisting of at least two struts, one end of each of said connecting struts being pivotally attached at an intermediate position along a respective one of said second and third legs of said support structure, and the other end of each of said at least two struts being releasably connectable, by a releasable connecting mechanism, to said central member at a selected one of a plurality of spaced apart positions along said central member, so that when said connecting struts are releasably connected to said central member, said support structure is maintained at a selected orientation with respect to said central member.

2. A stand according to claim 1, further comprising a second set of connecting struts comprising at least two struts, one end of each being pivotally attached at a position on a respective one of said second and third legs that is closer to said apex of said support structure than said first set of connecting struts, and the other end of each being releasably connectable, by a releasable connecting mechanism, to said central member at a selected position along said central member.

3. A stand according to claim 1, wherein the stand is made of a material selected from the group consisting of aluminum, plastic, steel, or fiberglass composite.

4. A stand according to claim 1, further comprising at least one supporting strut spanning said second and third leg at an intermediate position of said support structure.

5. A stand according to claim 1, wherein said V-shape support structure at its apex is provided with a pivotal connector such that said two legs of said V-shaped support are collapsible toward each other.

6. A stand according to claim 5, wherein said supporting strut is pivotally connected at one end to one of said legs of said V-shaped support structure, and the other end is releasably connectable, by a connection mechanism, to the other leg of said V-shaped support structure.

7. A stand according to claim 5, wherein said pivotal connector comprises a rivet or bolt and nut connecting said second and third legs, said second and third legs pivoting about said rivet or bolt and nut.

8. A stand according to claim 1, wherein said releasable connecting mechanism of each of said at least two connecting struts of said first set of struts comprises a hook disposed at an end of each connecting strut, said hook being of suitable size in girth to fit with a slight interference around said central member, said central member further including a plurality of protruding portions formed at spaced-apart positions therealong, said protruding portions being constructed and arranged to prevent said hooks from sliding along said central member beyond a range of motion defined between adjacent ones of said protruding portions.

9. A stand according to claim 2, wherein said connecting mechanism of each of said at least two struts of said second set of struts comprises a hook disposed at an end of each connecting strut, said hook being of suitable size in girth to fit with a slight interference around said central member.

10. A stand according to claim 8, wherein said plurality of protruding portions are beads of solder, braze, or weld of sufficient size so as to provide a stop for said strut hooks so as to fix the position of said struts when said struts are engaged with said central member or V-shaped support structure.

11. A stand according to claim 8, wherein said plurality of protruding portions are cylindrical rings slipped over said rod and soldered, brazed, welded, or otherwise fixed into place.

12. A stand according to claim 1, wherein said second and third leg have a plurality of protruding portions attached thereto defining fixed positions along said second and third leg.

13. A portable stand for supporting a portion of an elongated object such as a gun barrel or a fishing rod, said stand comprising:

an elongated central member having a two-pronged fork on each end thereof;

a support structure pivotally attached at an intermediate position along said central member, which, together with one end of said central member, defines a stand that is self supporting in a generally upright orientation; and at least one set of connecting struts, each of said connecting struts being attached at one end thereof to said support structure by a pivoting connection so as to permit said connecting strut to pivot and assume a variety of orientations with respect to said support structure, each of said connecting struts being releasably connectable at an opposite end thereof to said central member at a selected one of a plurality of positions along an extent of said central member, so that when all struts of a set of connecting struts are releasably attached to said central member at a selected one of said plurality of positions, said support structure is maintained at a selected orientation with respect to said central member to define a stand supportable by said support structure and a portion of said central member, with an opposite end of said central member projecting generally upwardly for supporting at a selected height a portion of an elongated object, such as a gun barrel or a fishing rod, between the prongs of the two-pronged fork at said opposite end.

14. A portable stand for supporting a portion of an elongated object such as a gun barrel or a fishing rod, said stand comprising:

an elongated central member having a two-pronged fork on each end thereof;

a support structure pivotally attached at an intermediate position along said central member, which, together with one end of said central member, defines a stand that is self supporting in a generally upright orientation with an end of said central member and said support structure straddling an upright wall; and at least one set of connecting struts, each of said connecting struts being attached at one end thereof to said support structure by a pivoting connection so as to permit said connecting strut to pivot and assume a variety of orientations with respect to said support structure, each of said connecting struts being releasably connectable at an opposite end thereof to said central member at a selected one of a plurality of positions along an extent of said central member, so that when all struts of a set of connecting struts are releasably attached to said central member at a selected one of said plurality of positions, said support structure is maintained at a selected orientation with respect to said central member to define a stand supportable by said support structure and a portion of said central member with, an opposite end of said central member projecting generally upwardly for supporting at a selected height a portion of an elongated object, such as a gun barrel or a fishing rod, between the prongs of the two-pronged fork at said opposite end.

15. A portable stand for supporting a portion of an elongated object such as a gun barrel or a fishing rod, said stand comprising:

an elongated central member having a two-pronged fork on each end thereof, said central member forming a first leg of said stand;

a V-shape support structure pivotally attached at its apex to an intermediate position along said central member, said V-shaped support structure forming a second and a third leg of said stand, which, together with said first leg, defines a stand that is self supporting in a generally upright orientation with said first, second and third legs being supported on a generally horizontal support surface; and a first set of connecting struts consisting of at least two struts, one end of each of said connecting struts being pivotally attached at an intermediate position along a respective one of said second and third legs of said support structure, and the other end of each of said at least two struts being releasably connectable, by a releasable connecting mechanism, to said central member at a selected one of a plurality of spaced apart positions along said central member, so that when said connecting struts are releasably connected to said central member, said support structure is maintained at a selected orientation with respect to said central member; and a second set of connecting struts comprising at least two struts, one end of each being pivotally attached at a position on a respective one of said second and third legs that is closer to said apex of said support structure than said first set of connecting struts, and the other end of each being releasably connectable, by a releasable connecting mechanism, to said central member at a selected position along said central member.

16. A stand according to claim 15, further comprising at least one supporting strut spanning said second and third leg at an intermediate position of said support structure.

17. A stand according to claim 15, wherein said V-shape support structure at its apex is provided with a pivotal connector such that said two legs of said V-shaped support are collapsible toward each other.

18. A stand according to claim 17, wherein said supporting strut is pivotally connected at one end to one of said legs of said V-shaped support structure, and the other end is releasably connectable, by a connection mechanism, to the other leg of said V-shaped support structure.

19. A stand according to claim 17, wherein said pivotal connector comprises a rivet or bolt and nut connecting said second and third legs, said second and third legs pivoting about said rivet or bolt and nut.

20. A stand according to claim 15, wherein said releasable connecting mechanism of each of said at least two connecting struts of said first set of struts comprises a hook disposed at an end of each connecting strut, said hook being of suitable size in girth to fit with a slight interference around said central member, said central member further including a plurality of protruding portions formed at spaced-apart positions therealong, said protruding portions being constructed and arranged to prevent said hooks from sliding along said central member beyond a range of motion defined between adjacent ones of said protruding portions.

21. A stand according to claim 20, wherein said plurality of protruding portions arc beads of solder, braze, or weld of sufficient size so as to provide a stop for said strut hooks so as to fix the position of said struts when said struts are engaged with said central member or V-shaped support structure.

22. A stand according to claim 15, wherein said connecting mechanism of each of said at least two struts of said second set of struts comprises a hook disposed at an end of each connecting strut said hook being of suitable size in girth to fit with a slight interference around said central member.

* * * * *